United States Patent
Miyakawa et al.

(10) Patent No.: US 6,273,983 B1
(45) Date of Patent: Aug. 14, 2001

(54) MOLDING FOR VEHICLE AND ITS MANUFACTURING METHOD

(75) Inventors: Naohisa Miyakawa, Chiba; Katsuhisa Kato, Ibaragi, both of (JP)

(73) Assignees: Tokiwa Chemical Industries Co., Ltd., Chiba; System Technical Co., Ltd., Ibaragi, both of (JP)

( * ) Notice: Subject to any disclaimer, the term of this patent is extended or adjusted under 35 U.S.C. 154(b) by 0 days.

(21) Appl. No.: 09/229,299

(22) Filed: Jan. 13, 1999

(30) Foreign Application Priority Data

Jan. 29, 1998 (JP) .................................. 10-054113
Feb. 10, 1998 (JP) .................................. 10-067563
Oct. 15, 1998 (JP) .................................. 10-330117

(51) Int. Cl.$^7$ .................................................. B29C 47/06
(52) U.S. Cl. ............................. 156/244.13; 264/173.17; 264/173.19; 264/173.14; 264/248; 156/244.25; 156/245
(58) Field of Search ................. 264/173.12, 173.14, 264/173.16, 177.1, 173.17, 173.19, 248; 156/244.11, 244.13, 244.25, 245

(56) References Cited

U.S. PATENT DOCUMENTS

| | | | |
|---|---|---|---|
| 4,511,526 | * | 4/1985 | Yamaguchi ........................ 264/129 |
| 4,748,212 | * | 5/1988 | Murachi et al. .................. 525/359.2 |
| 4,771,093 | * | 9/1988 | Nakane et al. ........................ 524/225 |
| 5,115,007 | * | 5/1992 | Chihara et al. ...................... 524/267 |
| 5,123,988 | * | 6/1992 | Iwasa .............................. 156/244.11 |
| 5,267,846 | * | 12/1993 | Miyama et al. ...................... 425/113 |
| 5,389,409 | * | 2/1995 | Iwasa et al. .......................... 428/31 |
| 5,424,019 | * | 6/1995 | Miyakawa et al. ............. 264/177.17 |
| 5,489,461 | * | 2/1996 | Iwasa et al. ......................... 428/122 |
| 5,716,573 | * | 2/1998 | Kamei ............................ 264/171.13 |

* cited by examiner

Primary Examiner—Jan H. Silbaugh
Assistant Examiner—Mark Eashoo
(74) Attorney, Agent, or Firm—Wenderoth, Lind & Ponack, L.L.P.

(57) ABSTRACT

A molding for a vehicle and its manufacturing method, wherein a molding body excellent in rigidity is formed by a mixture of a hard olefin based resin and powders such as mica, talc, glass fibre, etc., and is coated with a protective film layer of an olefin based resin, excellent in resistance to scuffing and chemicals, on the exposed surface. An intermediate adhesive layer having a thermofusion bond property, which is an olefin based thermoplastic elastomer resin composition, or a styrene based thermoplastic elastomer resin composition, can be sandwiched between the hard olefin based resin of the molding body and olefin based resin of the protective film layer. The molding body, the intermediate adhesive layer if present, and the protective film layer are integrally molded by several extruders and firmly laminated as a whole.

2 Claims, 6 Drawing Sheets

MOLDING FOR VEHICLE AND ITS MANUFACTURING METHOD

BACKGROUND OF THE INVENTION

1. Field of the Invention

The present invention relates to a molding for all kinds of automobiles and its manufacturing method. More particularly, this invention relates to the moldings of all kinds and method for manufacturing the molding of all kinds, such as a window molding, an outer molding, an inner molding, a roof molding of weather strip, etc. for mounting to automobiles, wherein the components of the molding body are made from high rigid and small linear expansion coefficient materials and wherein the surface sides exposed outside of the molding body are integrally laminated with a protective film layer excellent in resistance to scuffing, chemicals and climate.

2. Description of Prior Art

Polyvinyl chloride based resin was heretofore used widely in manufacturing the window molding, outer molding and inner molding of weather-strip of this kind. However, in view of the points, such as the weight-saving, recycling, atmospheric contaminating due to dioxin etc. the polyvinyl chloride based resin was substituted for olefin based thermoplastic elastomer resin, or styrene based thermoplastic elastomer resin which have come to be used, but depending on a location where it is to be fitted to automobile, the molding body of high rigid and of small linear expansion coefficient products has become to be necessary. Accordingly a reinforcing piece of metal such as stainless steel was embedded by using an adhesive into the thermoplastic elastomer resins as mentioned above, in which case there was the problems making the recycling impossible, and increasing the weight of molding body as well as the manufacturing cost.

To solve the above described problems, an inexpensive and highly rigid polypropylene resin among the hard olefin based resins was used for the molding body, but there was such problem that scuffing was easily formed on the exposed surface.

Trying to improve such problems as above described, olefin based resin composition, excellent in resistance to scuffing, chemicals and in appearance quality, was coated by extruding it on the exposed surface of polypropylene resin surface, but due to an inability of forming a film by extruding unless the molding temperature exceeds 250° C. as in the case with highly crystalline polypropylene resin, the extrusion molding capacity and appearance quality was problematic. Further the protective film comprising ethylene-methacrylic acid copolymer resin composition or a composition of metal salt thereof had also such problem that the protective film was easily removed during use of a long period of time from the molding body comprising the polypropylene resin. For this reason, adhesives with solvent were used, but the adhesives caused gases to generate from the solvents at the time of application which was problematic in respect to the working environment and atmospheric pollution.

Then, as described in the Japanese Patent Application No. 354722/1995, polyvinyl chloride based resin was laminated on the exposed surface of the molding body, but the dynamic crosslinking thermoplastic elastomer (Styrene based thermoplastic elastomer) of the adhesive layer between the protective film of polyvinyl chloride based resin and the molding body of polypropylene resin was very weak in thermofusion bond property and has easily been released therefrom with use for a long period of time, and also from the environment view of the polyvinyl chloride resin itself it was not practically used.

SUMMARY OF THE INVENTION

An object of the present invention is to resolve the short comings of all kinds of the prior arts and to provide a molding for vehicle and its manufacturing method, wherein a molding body excellent in rigidity is formed by the components of hard olefin based resin and powders such as mica, talc, glass fibre, etc. mixed into said hard olefin based resin, and is coated with a protective film layer comprising olefin based resin, excellent in resistance to scuffing and chemicals, on the exposed surface.

Another object of the present invention is to provide the molding for vehicle and its manufacturing method wherein an intermediate adhesive layer having thermofusion bond property and comprising an olefin based thermoplastic elastomer resin composition, or styrene based thermoplastic elastomer resin composition is sandwiched between the hard olefin based resin of the molding body and olefin based resin, or styrene based resin of the protective film layer located on the exposed surface of the molding body and wherein the molding body, the intermediate adhesive layer, and the protective film layer are integrally molded by several extruders and laminated toughly as whole.

In order to achieve the objects described above, the molding in accordance with the present invention comprises a molding body formed from a hard olefin based resin or a mixed synthetic resin having powders of mica, talc, glass fibre, etc. mixed into said hard olefin based resin. The molding body comprises a vertical supporting portion which functions as fitting member and a decorative portion exposed outwardly. The decorative portion is laminated with a protective film layer of olefin based resin, excellent in resistance to scuffing, chemicals, also in appearance quality, on the exposed surface. Further, the molding body comprising the hard olefin based resin has powders of mica, talc, glass fibre, etc. mixed as additive into the hard olefin based resin for the purpose of making the linear expansion coefficient smaller and the high rigidity.

The decorative portion is laminated with an intermediate adhesive layer comprising olefin based thermoplastic elastomer resin composition, or styrene based thermoplastic elastomer resin composition having the thermofusion bond property favourable to the molding body, and the intermediate adhesive layer on the decorative portion is laminated with the protective layer comprising olefin based resin composition or styrene based resin composition having the thermofusion bond property favourable to the intermediate adhesive layer and effective for resistance to scuffing, chemicals, etc. In addition, the component of the intermediate adhesive layer comprises olefin based thermoplastic elastomer resin composition, or styrene based thermoplastic elastomer resin composition of material more flexible and elastomeric than the hard olefin based resin forming the molding body and the olefin based resin composition or styrene based resin composition forming the protective layer to enhance the resistance to scuffing and the cushioning property.

In the method for manufacturing the molding body, there are two cases of two kinds of resins and three kinds of resins being used. In the former case, the hard olefin based resin forming the molding body or the mixed synthetic resin having powders of mica, talc, glass fibre, etc. mixed into the hard olefin based resin is poured into a first extruder, and the olefin based resin composition or styrene based resin composition forming the protective film layer is poured into a second extruder.

The molding body and the protective film layer are integrally and toughly laminated polymerically inside a single molding die in operating the first and the second extruders simultaneously.

In the case of three kinds of resins used, the hard olefin based resin or the mixed synthetic resin having powders of mica, talc, glass fibre, etc. mixed into the hard olefin based resin is poured into a first extruder for forming the molding body. The olefin based thermoplastic elastomer resin composition or styrene based thermoplastic elastomer resin composition is poured into a second extruder for forming the intermediate adhesive layer. The olefin based resin composition or styrene based resin composition is poured into a third extruder for forming the protective film layer on the exposed surface of the molding body. The molding body, the intermediate adhesive layer and the protective film layer are integrally formed and toughly laminated together inside a single molding die by operating three extruders simultaneously.

BRIEF DESCRIPTION OF THE DRAWINGS

FIG. 8 is a partially cutaway vertical sectional view showing the process for manufacturing the molding according to the invention by using two extruders; and.

DETAILED DESCRIPTION OF THE PREFERRED EMBODIMENT

Figure 1:
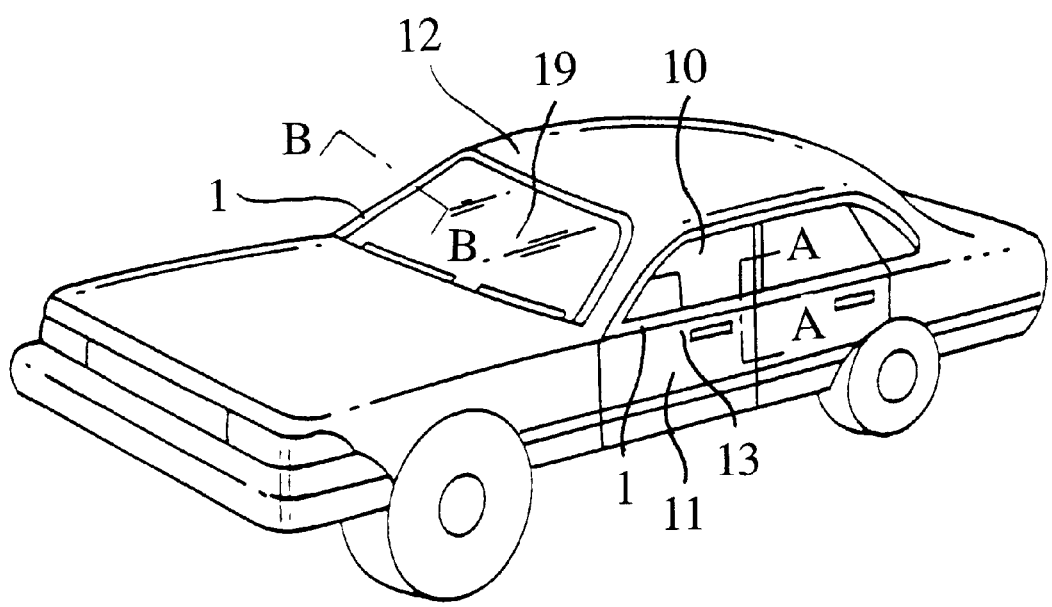
FIG. 1 is a perspective view of the automobile to which the molding according to the present invention is mounted.
Figure 2:
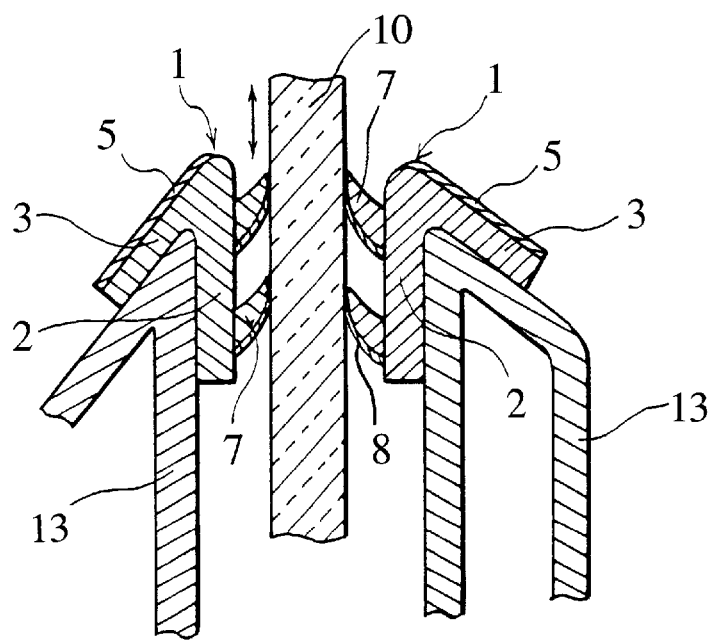
FIG. 2 is a vertical sectional side view taken along the line A—A of FIG. 1 showing the molding according to the present invention.
Figure 3:
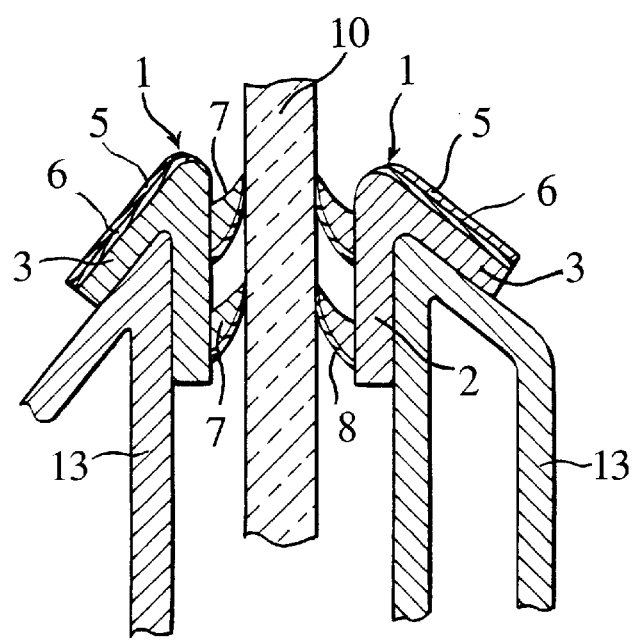
FIG. 3 is a vertical sectional side view taken along the line A—A of FIG. 1 showing the molding having an inner adhesive layer according to the invention.

An embodiment of the molding according to the invention will be described by way of an example of an outer molding and inner molding of weather strip referring to the drawings of FIG. 1 to FIG. 5, in which FIG. 1 shows that the molding is mounted on the upper end of door panels 13, 13 for guiding and holding an elevating glass window 10 in the door 11 of automobile body 12 according to the present invention. FIGS. 2 and 3 show the mounting condition for the outer molding and inner molding to the vehicle. FIG. 2 shows the outer and inner moldings referring to claims 1 and 2, and FIG. 3 shows the outer and inner moldings referring to claims 3, 4, 5 and 6.

Figure 4:
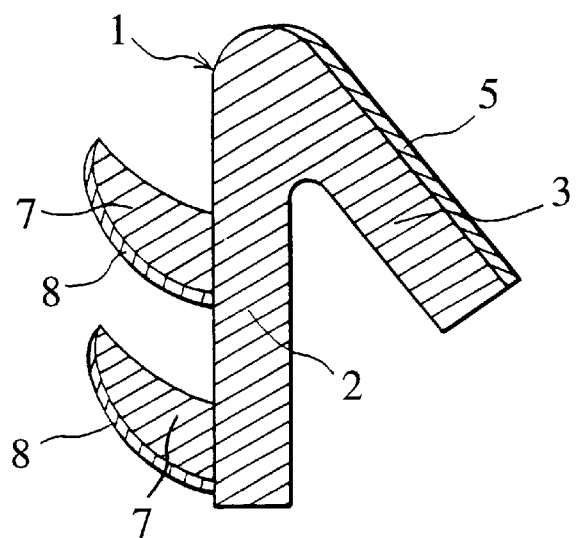
FIG. 4 is a partly enlarged vertical sectional side view of the molding of FIG. 2.

FIG. 4 shows only the inner molding of FIG. 2. A molding body 1 comprises a vertical supporting portion 2 and a decorative portion 3 located in the upper portion of said vertical supporting portion 2 which are integrally formed with polypropylene resin in hard olefin based resin, or a mixed synthetic resin having powders of mica, talc, glass fibre mixed in said polypropylene resin. The surface of the decorative portion 3 is laminated with a protective film layer 5 made of olefin based resin composition, such as a highly crystalline polypropylene resin, or ethylene-methacrylic acid copolymer composition, its metal salt composition excellent in resistance to scuffing, chemicals, etc. The molding body 1 is provided with a lip-like pressing pieces 7 in pressure contact with the elevating glass window 10, said pressure piece 7 is made of a soft olefin based thermoplastic elastomer resin composition or styrene based thermoplastic elastomer resin composition, and is provided on the pressing surface to the window glass with a pressing film 8 of less frictional resistance processed with nylon flockings or having a rough surface made of a mixed synthetic resin of two different natures of olefin based resins.

Figure 5:
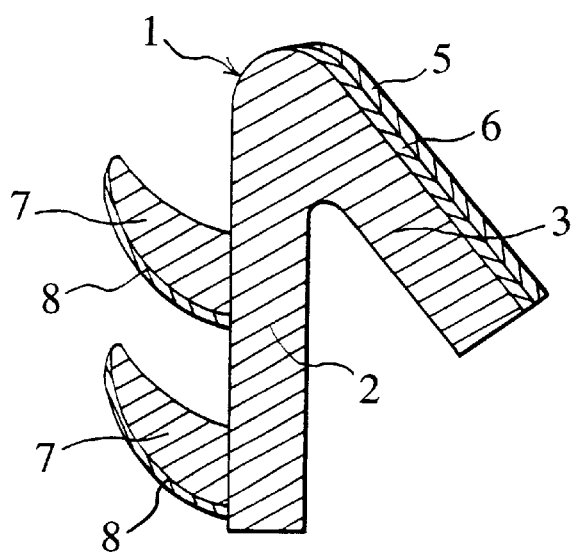
FIG. 5 is a partly enlarged vertical sectional side elevation of the molding of FIG. 3.

FIG. 5 shows only the inner molding of FIG. 3 A molding body 1 comprises a vertical supporting portion 2 and a decorative portion 3 located in the upper portion of said vertical supporting portion 2 which are integrally formed with polypropylene resin in hard olefin based resin, or a mixed synthetic resin having powders of mica, talc, glass fibre, etc. mixed in the polypropylene resin.

The decorative portion 3 is provided in the surface with a soft inner adhesive layer 6 comprised of olefin based thermoplastic elastomer resin composition or styrene based thermoplastic elastomer resin composition, and the surface exposed on the inner adhesive layer 6 is laminated with the protective film layer 5 made of relatively hard olefin based resin composition, or styrene resin based resin composition comprising ethylene methacrylic acid copolymer composition, or its metal salt composition, excellent in resistance to scuffing, chemicals and in appearance quality. The molding body 1 is provided with a lip-like pressing piece 7 in pressure contact with an elevating window glass 10 provided in the molding body 1, said pressing piece 7 is made of a soft olefin based thermoplastic elastomer resin composition, or styrene based thermoplastic elastomer resin composition, and is provided on the pressing surface to the window glass 10 with a pressing film 8 of less frictional resistance processed with nylon flockings, or having a rough surface made of the mixed synthetic resin of two different natures of olefin based resins.

Figure 6:
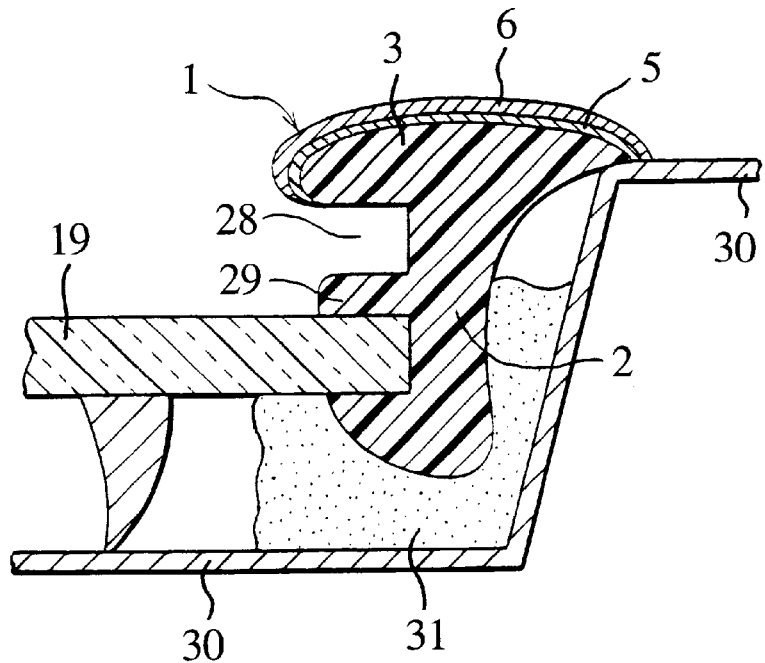
FIG. 6 is a vertical sectional view of the window molding taken along the line B—B of FIG. 1.

FIG. 6 shows an embodiment of the window molding according to the present invention. A molding body 1 of the window molding is mounted between the outer circumference of window glass 19 and body panel 30, and comprises a vertical supporting portion 2 and a decorative portion 3 which are integrally formed. The vertical supporting portion 2 is provided on one side with a rain water guide channel 28 formed between the decorative portion 3 and a supporting projection 29 and with a groove introducing the window glass 19 formed between the supporting projection 29 and the end portion of the vertical supporting portion 2. Reference number 13 shows adhesive for fixing the window molding in the space between the window glass 19 and body panel 30.

Figure 7:
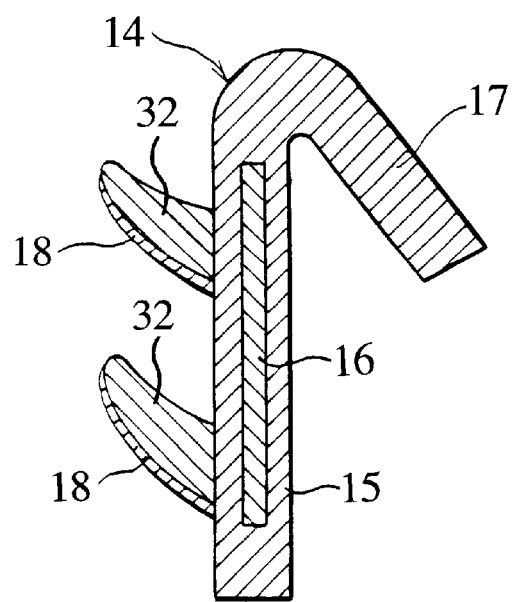
FIG. 7 is a partly enlarged vertical sectional view of the prior art molding.

FIG. 7 shows a molding body 14 of the inner molding of the weather strip in the prior arts which is formed integrally with a vertical supporting member 15 having a metal reinforcing core 16 embedded therein, a decorative upper portion 17 and pressing piece 32 32 with a pressing film 18. The molding body 14 of the prior art is formed with polyvinylchloride, rubber, olefin thermoplastic elastomer composition, styrene based thermoplastic elastomer composition, etc.

Figure 8:
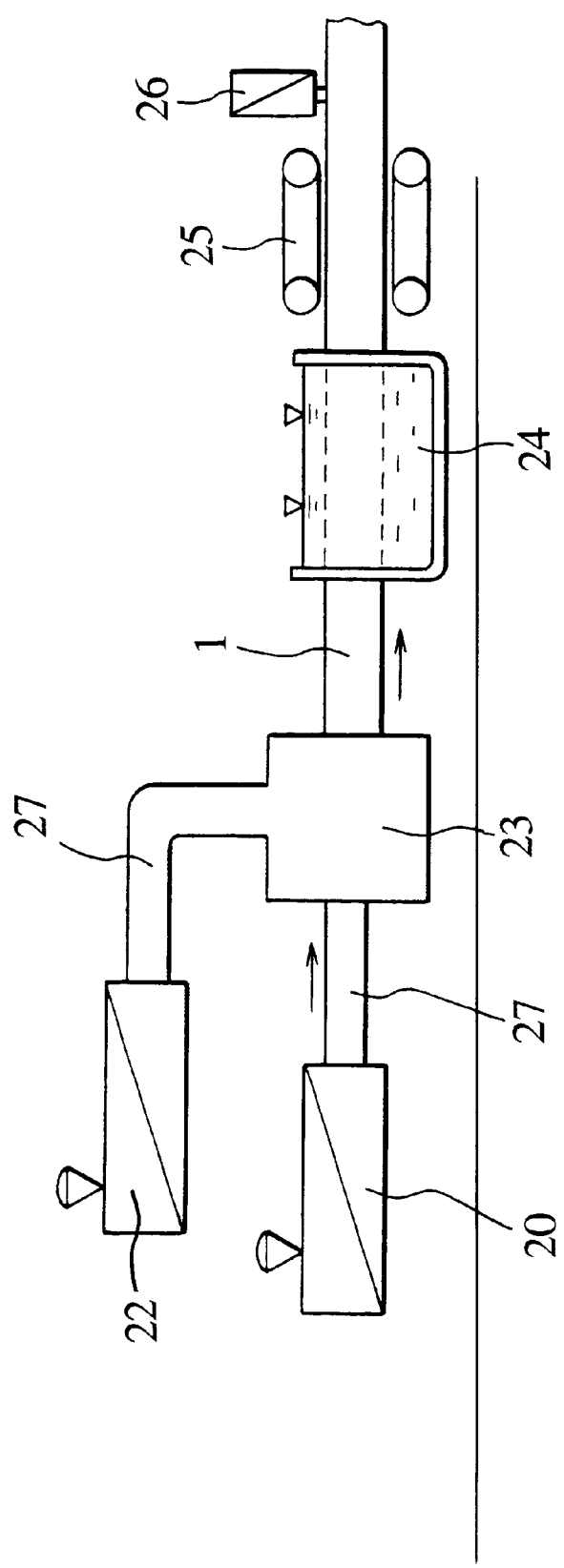

The manufacturing method of molding according to the present invention will be described in connection with FIG. 8. A first extruder 20 for forming the molding body 1 contains polypropylene resin in the hard olefin based resin, or the mixed synthetic resin having powders of mica, talc, glass fibre, etc. mixed in said polypropylene resin. A second extruder 22 for forming the protective film layer 5 contains olefin based resin. By operating the two extruders 20, 22 simultaneously, each of the melted synthetic resins passes through flowing pipes 27, 27 from the two extruders 20, 22 to a single molding die 23, in which the molding body 1 is molded and is thermofusion-bondedly laminated integrally with the protective film layer 5 on the surface of the decorative portion 3. The molded molding body 1 is then drawn by a pulling machine 25 through a cooling water pool 24 to a cutting machine 26, in which the molding body 1 is cut to the predetermined dimension to manufacture the molding.

Figure 9:
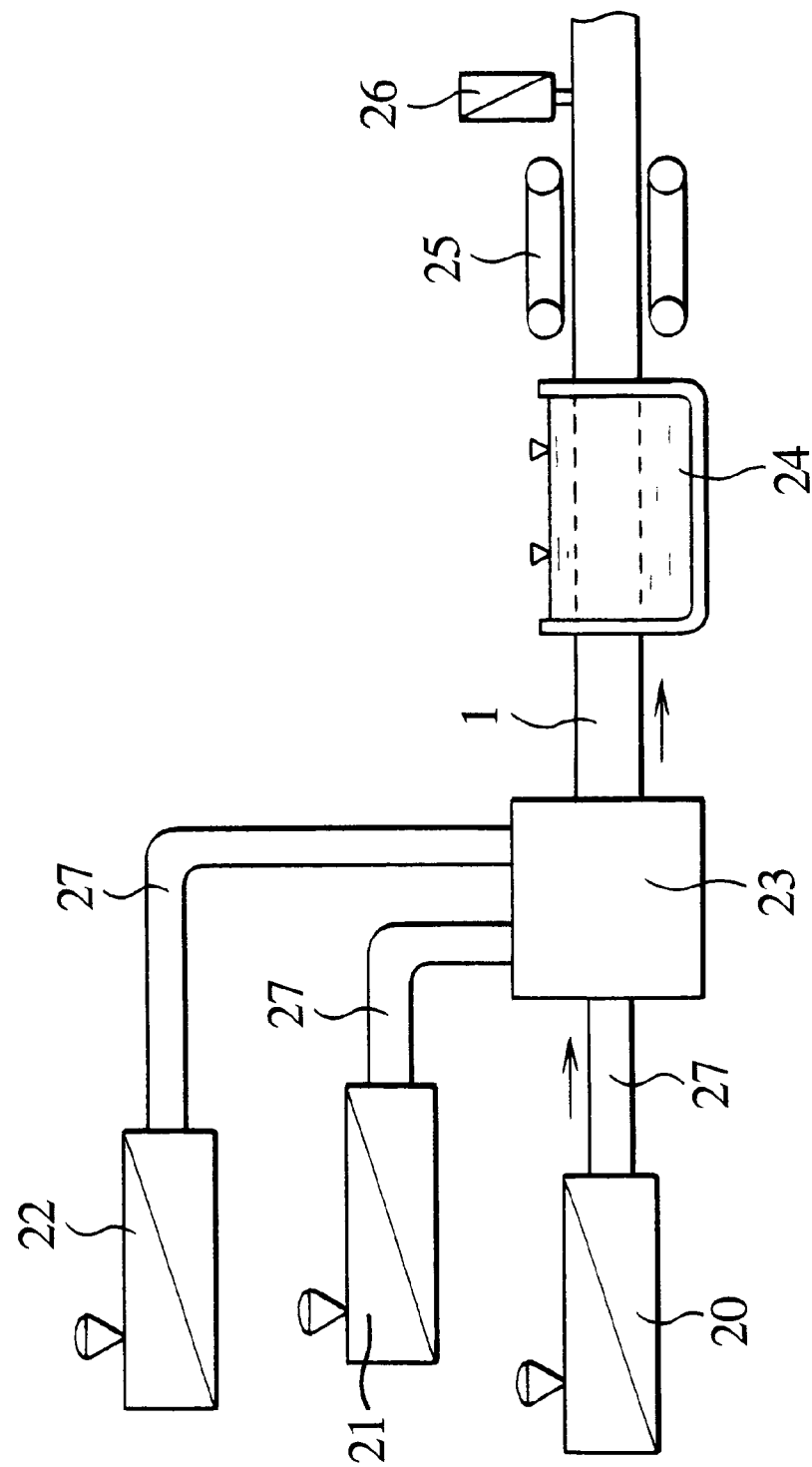
FIG. 9 is a partially cutaway vertical sectional view showing the process for manufacturing the molding according to the invention by using three extruders.

In the manufacturing method of the molding according to the invention as shown in FIG. 9, a first extruder 20 for forming the molding body 1 contains polypropylene resin in hard olefin based resin or a mixed synthetic resin having powders of mica, talc, glass fibre, etc. mixed into said polypropylene resin. A second extruder 22 contains olefin based resin or styrene based resin comprising ethylene-methacrylic acid copolymer or metal salt thereof as the component for forming the protective film layer 5 located on the outer surface. A third extruder 21 contains a soft olefin based thermoplastic elastomer resin composition, or styrene based thermoplastic elastomer resin composition as the component for forming the inner adhesive layer 6. By operating the three extruders 20, 21, 22 simultaneously, each of the melted synthetic resins passes through flowing pipes 27, from the three extruders to a single molding die 23, in which the molding body 1 is molded and is meltedly bonded by the inner adhesive layer 6 with the protective film layer 5 on the surface of the decorative portion 3 integrally. Then, the molded molding body 1 is drawn by a pulling machine 25 through a cooling pool 24 to a cutting machine 26, in which the molding body 1 is cut to a predetermined dimension to manufacture the molding.

Polypropylene resin having hardness more than 90 degree (JIS K7215 Hardness A) is used for the polypropylene resin in hard olefin based for forming the molding body 1. Further, the molding body may be also composed of the mixed synthetic resin having powders of mica, talc, glass fibre, etc. mixed in the polypropylene resin. On the other hand, olefin based thermoplastic elastomer resin composition, or styrene based thermoplastic elastomer resin composition for forming the inner adhesive layer 6 is a soft elastomer resin composition of 40 to 80 degree of hardness (JIS K7215 Hardness A). Olefin based resin comprising the composition of ethylene-methacrylic acid copolymer or its metal salt, or olefin based resin or styrene based resin comprising high crystalline polyethylene for forming the protective film layer 5 has hardness more than 90 degree (JIS K7215 Hardness A).

Further, the lip-like pressing piece 7 in contact with the elevating window glass 12 is composed of the same thermoplastic elastomer composition with that of the inner adhesive layer. The pressing film 8 formed on the surface of the lip-like pressing piece 7 in contact with the surface of the elevating glass window 10 is composed of a film, excellent in resistance to wear and of less friction resistance proceeded with nylon flocking, urethane coating, or having a rough surface formed by a mixture of two synthetic resins of different melting point.

As one example of extruding process of the molding body, polypropylene resin is poured into the first extruder 20 and is heated to a temperature of 160 to 240° C.; olefin based thermoplastic elastomer resin composition is poured into the second extruder 22 and is heated to a temperature of 160 to 240° C.; a composition of ethylene methacrylic acid copolymer or composition of metal salt thereof is poured into the third extruder 21 and is heated to a temperature of 160 to 240° C.; and by operating the three extruders simultaneously, the three sorts of synthetic resins are laminated respectively and is molded as the molding body integrally inside a single molding die 23. In the moldings of all kinds, one example of the inner molding of weatherstrip is described above and the example of window molding is shown only in FIG. 6.

The following linear expansion coefficient was obtained and shown in Table 1 as example in which Talc powder was mixed with polypropylene resin in the hard olefin based resin according to the present invention:

TABLE 1

|  | Sample 1 | Sample 2 | Sample 3 |
|---|---|---|---|
| Ratio of Polypropylene | 100% | 84% | 60% |
| Ratio of Talc | 0% | 15% | 40% |
| Linear Expansion Coefficient ($\times 10^{-4}$ cm/cm.C) | 1.4 | 0.71 | 0.33 |

In the molding of the present invention, the exposed outer surface of the molding body is significantly reinforced by the protective film layer of olefin and at the same time has an excellent effect on resistance to scuffing, chemicals and on appearance quality. In addition, the protective film layer can toughly be laminated integrally by thermal-fusion-bonding on the molding body due to the inner adhesive film, and the inner adhesive layer acts as cushion to absorb the shock etc. of the protective film layer of the outer surface.

Further, by having used the mixed synthetic resin mixed with powders of mica, talc, glass fibre into polypropylene resin for the molding body, the molding body may be improved for the rigidity by having an excellent effect on reduction in contraction and expansion. Besides, the moldings of the present invention is much better for working environment and in other environmental aspects of atmospheric pollution as well as of making weight-saving and recycling feasible, since it does not use any adhesive as well as the metal reinforcing member.

What is claimed is:

1. A manufacturing method for a molding for an automobile comprising:

pouring a mixture of polypropylene resin and more than 15 weight % of powder of mica, talc or glass fibre into a first extruder for forming a molding body of a hard olefin based resin;

pouring a highly crystalline polypropylene resin for forming a protective film layer into a second extruder;

operating the first and second extruders simultaneously; and laminating integrally the molding body and protective film layer in a single molding die.

2. A manufacturing method for a molding for an automobile comprising:

pouring a mixture of polypropylene resin and more than 15 weight % of powder of mica, talc or glass fibre into a first extruder for forming a molding body of a hard olefin based resin;

pouring a highly crystalline polypropylene resin for forming a protective film layer into a second extruder;

pouring an olefin based thermoplastic elastomer resin composition or styrene based thermoplastic elastomer resin composition for forming an inner adhesive film layer into a third extruder;

operating the first, second and third extruders simultaneously; and laminating integrally the molding body, the inner adhesive film layer and the protective film layer in a single molding die.

* * * * *